(12) United States Patent
Wang et al.

(10) Patent No.: US 8,213,527 B2
(45) Date of Patent: Jul. 3, 2012

(54) CHANNEL VARIATION DETECTION OF WIRELESS CHANNEL FOR ADAPTIVE TRANSMISSION SCHEMES

(75) Inventors: Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 593 days.

(21) Appl. No.: 12/410,659

(22) Filed: Mar. 25, 2009

(65) Prior Publication Data

US 2010/0246720 A1    Sep. 30, 2010

(51) Int. Cl.
*H04L 1/20* (2006.01)
*H04B 1/38* (2006.01)

(52) U.S. Cl. .......................... 375/267; 375/219; 375/222

(58) Field of Classification Search .......... 375/219–220, 375/222, 260, 278, 284–285, 316, 346, 259, 375/267; 370/281, 295, 302, 343, 480–481; 455/456.5, 456.6, 561, 91, 101, 103, 456

See application file for complete search history.

(56) References Cited

U.S. PATENT DOCUMENTS

| | | | |
|---|---|---|---|
| 7,305,055 B1 * | 12/2007 | Gardner et al. | 375/347 |
| 7,586,991 B2 * | 9/2009 | Choi | 375/262 |
| 7,639,660 B2 * | 12/2009 | Kim et al. | 370/343 |
| 7,965,782 B1 * | 6/2011 | Vijayan et al. | 375/262 |
| 8,068,564 B2 * | 11/2011 | Kolze et al. | 375/340 |
| 2005/0007983 A1 * | 1/2005 | Lee et al. | 370/334 |
| 2006/0013590 A1 * | 1/2006 | Hueda et al. | 398/149 |
| 2007/0211747 A1 * | 9/2007 | Kim | 370/437 |
| 2007/0237262 A1 * | 10/2007 | Hwang et al. | 375/316 |
| 2008/0273609 A1 * | 11/2008 | Murakami et al. | 375/260 |
| 2009/0265601 A1 * | 10/2009 | Mielczarek et al. | 714/799 |
| 2009/0268787 A1 * | 10/2009 | Cairns et al. | 375/148 |
| 2011/0028141 A1 * | 2/2011 | Yang et al. | 455/422.1 |

* cited by examiner

*Primary Examiner* — Lawrence B Williams
(74) *Attorney, Agent, or Firm* — Edell, Shapiro & Finnan, LLC

(57) ABSTRACT

A first wireless communication device recovers data from a transmission received over a wireless channel from a second wireless communication device and processes the received data with each of multiple channel variation compensations to produce corresponding processed received data subjected to respective ones of the multiple channel variation compensations. For symbols in the received data and in each of the processed received data, distances are computed to their closest symbols in a symbol constellation set used in the wireless transmission. A corresponding distance metric is computed from the distances for symbols in the received data and from the distances for symbols in each of the processed received data resulting in a distance metric for the received data, and a distance metric for each of the processed received data. Channel variation of a wireless channel between the first and second wireless communication devices is estimated based on the distance metrics.

25 Claims, 5 Drawing Sheets

Perform for symbols of each of the received data, first processed received data and second processed received data to generate first distance metric, second distance metric and third distance metric, respectively ■     Points in constellation set for a given modulation scheme ☐     Symbol of received data or processed received data

CHANNEL VARIATION DETECTION OF WIRELESS CHANNEL FOR ADAPTIVE TRANSMISSION SCHEMES

TECHNICAL FIELD

The present disclosure relates to wireless communication devices and systems and more particularly to techniques for determining a measure of channel variation in a wireless channel between two wireless radio communication devices.

BACKGROUND

In current and future wireless communication systems, such as the IEEE 802.16 communication standard, known commercially as "WiMAX" and the 3rd Generation Partnership Project (3GPP) Long Term Evolution (LTE) standard, high data rate transmissions for mobile users is a requirement.

High data rate transmissions between two devices when one device on the link is moving create significant challenges. Movement of a device on a wireless link causes variation in the wireless channel with respect to another device on the link. At one instant, when the device is at one position, the channel quality may be good and at another instant when the device is at another position, the channel quality may be poor.

The condition or quality of the channel affects the type of transmission data rate, modulation scheme and transmission scheduling that can be supported. To support high data rate transmissions for mobile devices, a base transceiver station dynamically selects the optimal transmission scheme, such as parameters for one or more of a modulation, data rate and coding level, based on the channel conditions. The transmission schemes may also include different multiple-input multiple-output (MIMO) transmission techniques (when both devices on the link have multiple antennas and other hardware to support MIMO techniques), such as space-time coding, beamforming and spatial multiplexing. When the channel conditions are good, a higher transmission data rate scheme is employed to maximize the transmission throughput and/or improve the quality of service. When the channel conditions are poor, a lower data rate scheme is utilized to guarantee the successful reception of a transmission.

Furthermore, the variation of the wireless channel makes adaptive transmission scheduling challenging. In most adaptive transmission scheduling techniques, channel state or quality information is needed. A first device on the link, e.g., a base transceiver station, estimates the channel state information based on received signals or feedback of specifically configured signals from the other device, e.g., a mobile station, on the link. When the mobile station is moving, there is aging or delay between the time of a scheduled transmission and the time when the channel information was obtained. The channel information obtained at the current frame may not be reliable for the data transmission several frames later when a mobile station is moving since the channel will vary over time with movement of the mobile station. The reliability of the channel information for adaptive transmission schemes depends on the channel variation and the aging from the time when the channel information is obtained to the time of data transmission. Therefore, to effectively schedule high data rate transmissions, the base transceiver station needs to know the channel variation, that is, how slow or fast the channel is varying, i.e., a measure of variation of the channel, as well as an accurate estimate of the channel conditions.

There are numerous channel variation detection heretofore known. One technique is to use so-called pilot signals, which are signals of predetermined known values, from which a receiving device can derive information about variations in the channel. Another technique is to measure the received signal strength indication (RSSI) from received signals and track changes in the RSSI. Still another technique is to have a device transmit the same data in two or more transmission bursts, such as in several different orthogonal frequency division multiple access (OFDMA) symbols, and then compare the difference between the received two or more transmission bursts of the same data. Still another technique is to have one device on the link detect the channel variation and then to transmit a feedback signal to the other device, where the feedback signal contains information describing the measured channel variation.

These channel variation detection techniques have disadvantages. The pilot signal technique requires a sufficient number of pilot signals in order to make accurate estimates of the channel variation. In some systems, there may not be sufficient bandwidth available to have enough pilot signals for channel variation detection. For example, in a WiMAX system, and there are only a few pilot subcarriers in a small uplink transmission burst, and they may be allocated across different sub-carriers. Using RSSI for the channel variation detection requires a relatively long tracking history to be stored by the base transceiver station, and each mobile station would need to transmit with the same power for the RSSI technique to work. However, transmission power adjustment/control is usually required in adaptive transmission schemes. Therefore, RSSI-based channel variation detection has some limitations for practical applications. In many wireless communication systems, such as OFDMA systems, transmitting the same data in two or more different OFDM symbols is difficult to fulfill. Finally, the feedback signal technique requires additional channel bandwidth, and in many wireless communication systems, there is limited or no additional bandwidth available.

DESCRIPTION OF EXAMPLE EMBODIMENTS

Overview

Techniques are disclosed herein to determine channel variation of a wireless channel between a first wireless communication device and a second wireless communication device. The first wireless communication device receives a wireless transmission sent by the second wireless communication device. Received data is recovered from the wireless transmission received at the first wireless communication device. The received data is processed with each of multiple channel variation compensations to produce corresponding processed received data subjected to respective ones of the multiple channel variation compensations. For symbols in the received data and in each of the processed received data, distances are computed to their closest symbols in a symbol constellation set used by the second wireless communication device in the wireless transmission. A corresponding distance metric is computed from the distances for symbols in the received data and from the distances for symbols in each of the processed received data. Thus, there is distance metric for the received data, and a distance metric for each of the processed received data. Channel variation of a wireless channel between the first wireless communication device and the second wireless communication device is estimated based on the distance metrics.

Figure 1:
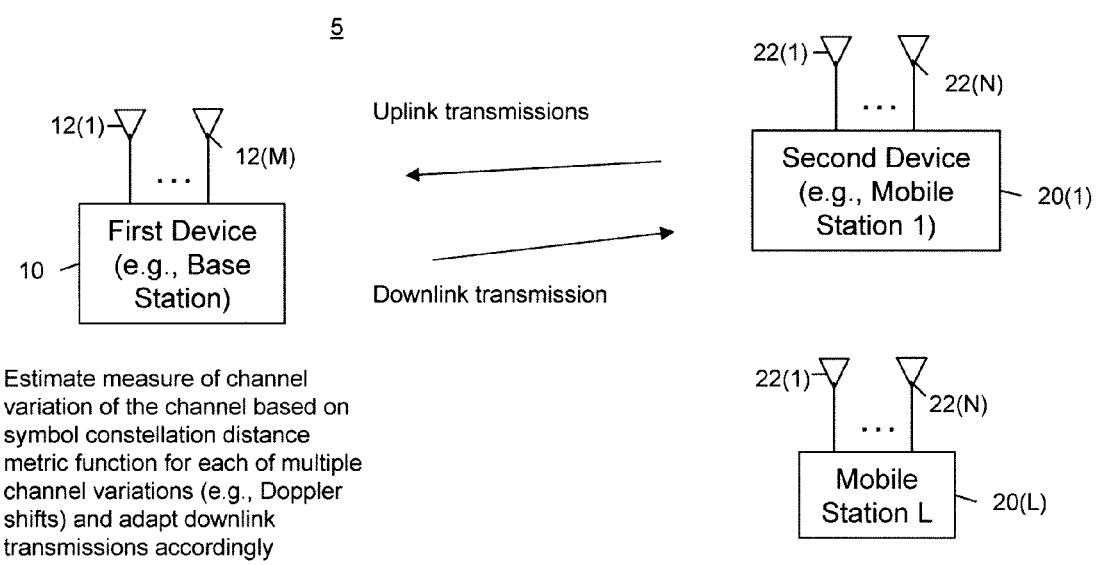
FIG. 1 is a block diagram of a wireless communication system in which at least one device on a wireless link is configured to determine channel variation based on symbol constellation distance metrics.

Referring first to FIG. 1, a wireless communication system is shown generally at reference numeral 5. The system 10 comprises a first wireless communication device, e.g., a base station (BS) 10, and a plurality of second wireless communication devices, e.g., mobile stations (MSs) 20(1)-20(L). The BS 10 comprises at least one antenna, but in more practical cases, it comprises a plurality of antennas 12(1)-12(M), and each MS 20(1)-20(L) comprises at least one, and in some cases, a plurality of antennas 22(1)-22(N). The BS 10 may connect to other wired data network facilities (not shown) and in that sense serves as a gateway or access point through which the MSs 20(1)-20(L) have access to those data network facilities.

The BS 10 may wirelessly communicate with individual ones of the MSs 20(1)-20(N) using a wideband wireless communication protocol. An example of such a wireless communication protocol is the IEEE 802.16 communication standard, known commercially as WiMAX.

According to the techniques described herein, transmissions are received at a wireless communication device (e.g., the BS 10) that were sent by another wireless communication device (e.g., an MS), and the BS 10 estimates a measure of channel variation of the channel between it and the MS based on a symbol constellation distance metric function for each of multiple, but a finite number of, channel variation compensations (e.g., Doppler shifts). The BS 10 can then use the measure of channel variation to adapt a transmission scheme comprising at least one of the transmission data rate, coding level and modulation type according to the channel variation measure in order to optimize data throughput, particularly in a system with high data rate requirements.

The techniques described herein may be employed when the BS 10 transmits in downlink (DL) transmissions to a particular one of the plurality of MSs 20(1)-20(L) based on uplink (UL) transmissions the BS 10 receives from the particular MS, or they may be employed by any one or more of the MSs 20(1)-20(L) when it/they transmit UL transmissions to the BS 10 based on received DL transmissions from the BS 10.

Figure 2:
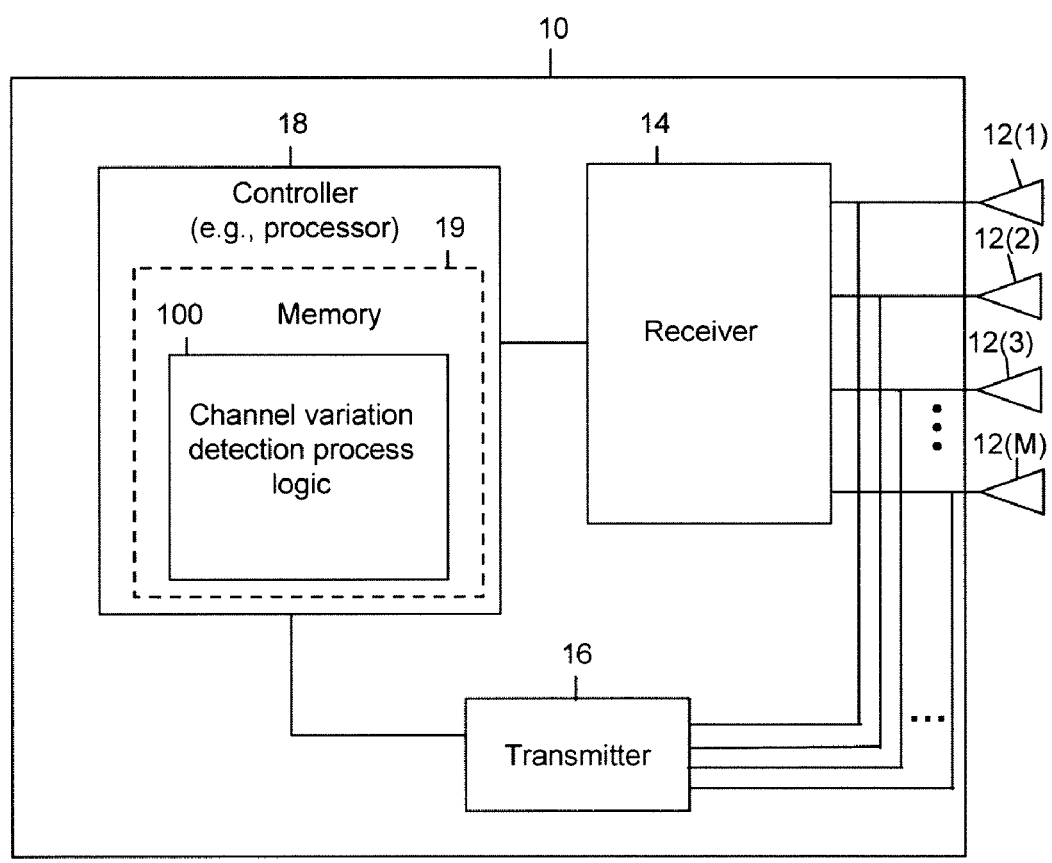
FIG. 2 is a block diagram of a wireless communication device configured to determine channel variation based on symbol constellation distance metrics.

Reference is now made to FIG. 2 that shows an example of a block diagram of a BS 10 that is configured to perform the channel variation detection and adaptive transmission techniques described herein. As shown in FIG. 2, the BS 10 comprises a radio receiver 14, a radio transmitter 16 and a controller 18. The controller 18 supplies data to the transmitter 16 to be transmitted and processes signals received by the receiver 14. In addition, the controller 18 performs other transmit and receive control functionality. Part of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The receiver 14 receives the signals detected by each of the antennas 12(1)-12(M) and supplies corresponding antenna-specific receive signals to controller 16. Likewise, the transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 comprises a memory 19 or other data storage block that stores data used for the techniques described herein. The memory 19 may be separate or part of the controller 18. In addition, instructions for channel variation detection process logic 100 may be stored in the memory 19 for execution by the controller 18. The controller 18 may be further configured to generate beamforming weights based on information produced by the channel variation detection process logic 100. The controller 18 supplies the beamforming weights to the transmitter 16 and the transmitter 16 applies the beamforming weights to a signal to be transmitted to produce a plurality of weighted antenna-specific transmit signals that are transmitted by corresponding ones of the plurality of antennas 12(1)-12(M).

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein (and/or to store software or processor instructions that are executed to carry out the computations described herein). Thus, the process 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. Again, some or all of the controller functions described herein, such as those in connection with the process logic 100, may be implemented in a modem.

Any of the MSs 20(1)-20(L) may be configured in a manner similar to that shown in FIG. 2, and in this regard, also perform the channel variation detection techniques described herein. For simplicity and example purposes only, the channel variation detection process logic 100 is described as being performed in the BS 10 with respect to communications that BS 10 has with any given one of the plurality of MSs 20(1)-20(L). Moreover, the BS 10 is configured to perform the channel variation detection techniques separately for each of the plurality of MSs 20(1)-20(L).

Figure 3:
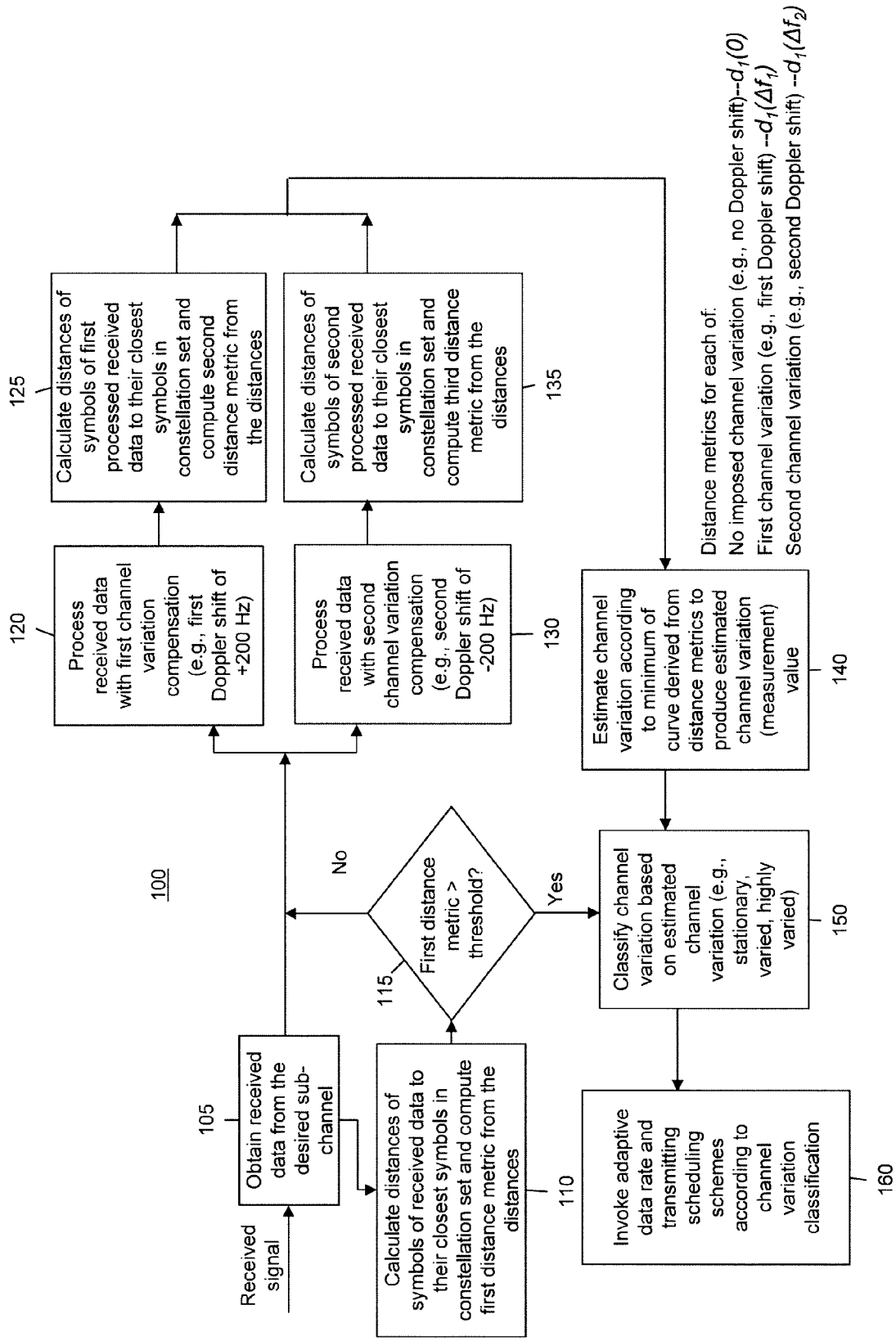
FIG. 3 is an example of a flow chart for process logic that determines channel variation based on symbol constellation distance metrics.
Figure 4:
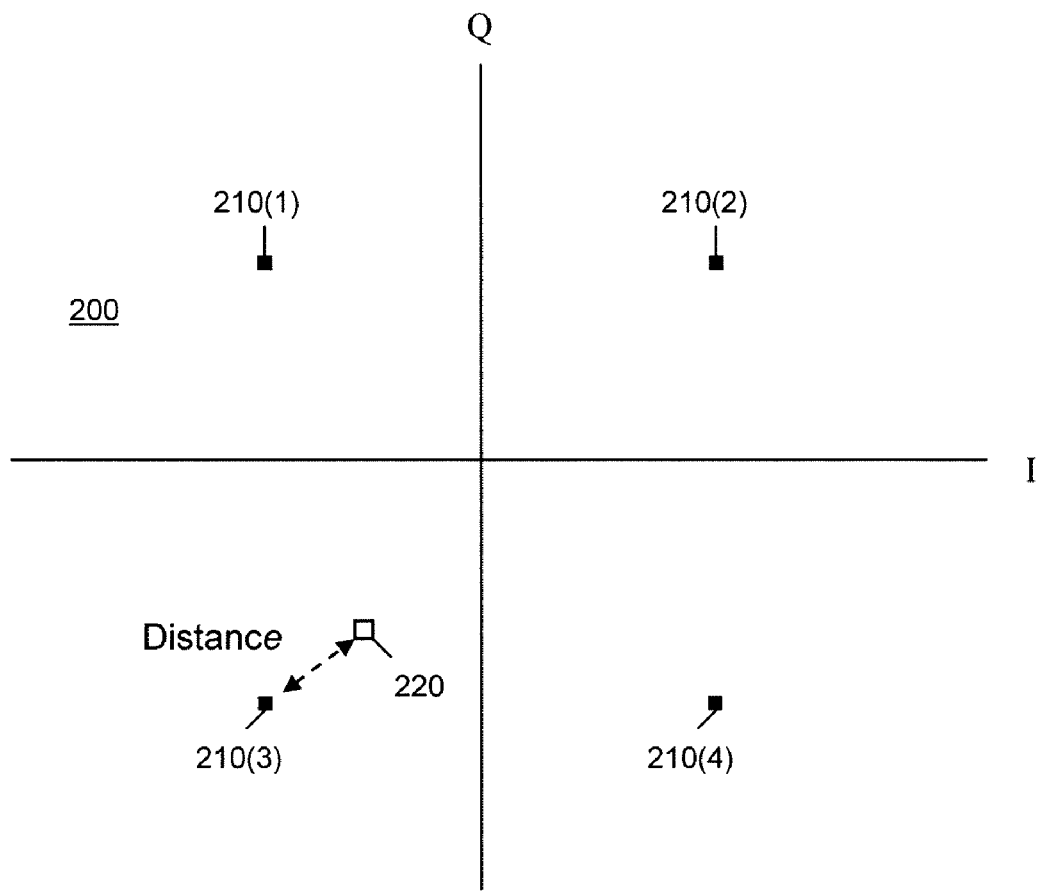
FIG. 4 is a diagram showing an example of a symbol constellation and how a distance is computed between a symbol of received data to a closest symbol in the symbol constellation.
Figure 5:
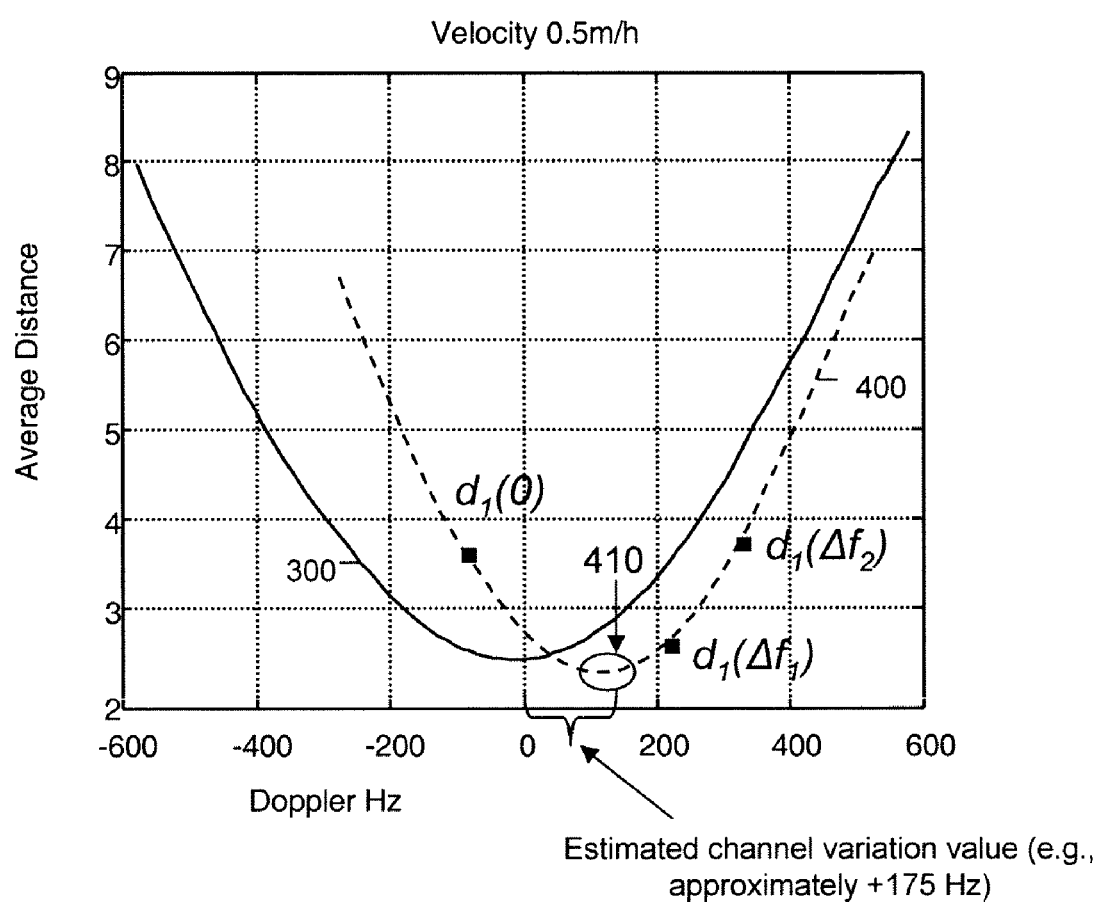
FIG. 5 is a diagram that shows a plot of a curve that is derived from multiple distance metrics and from which an estimated channel variation value is determined.

Turning now to FIG. 3 in conjunction with FIGS. 4 and 5, the channel variation detection process logic 100 is described in detail. Generally, the channel variation detection process logic 100 operates as follows. At a first wireless communication device, e.g., BS 10, a (normal traffic) wireless transmission is received from a second wireless communication device, one of the MSs 20(1)-20(L), such as MS 20(1). The BS 10 recovers received data from the received wireless transmission from MS 20(1). The BS 10 processes the received data with each of multiple channel variation compensations to produce corresponding processed received data subjected to respective ones of the multiple channel variation compensations. For the received data and each of the processed received data, the BS 10 computes a distance metric to the symbol constellation (set) used by the MS 20(1) in the wireless transmission. The distance metric is obtained from the distance of each symbol of the received (or processed received) data to its closet symbol in the constellation set used by the MS 20(1). For example, the BS 10 may compute an average of the distances for all symbols associated with the received data to derive the distance metric for the received data. A similar computation is made for the distance metric for the processed received data from the distances for symbols of the processed received data to their closest symbols in the symbol constellation set. In addition, in some cases, it may be possible to use some, not but all, symbols in order to derive the distance metric for the received and/or processed received data. The BS 10 stores a corresponding distance metric for the received data and each of the processed received data. The BS 10 estimates a (measure of) channel variation of the wireless channel between it and the MS 20(1) based on the distance metrics. The BS 10 performs similar functions with respect to signals it receives from each of the plurality of MSs 20(1)-20(L). The symbol constellation used by any given MS at any given time may be different, but the BS 10 knows which type of modulation scheme each MS is using at any given time because the BS 10 commands each of the MSs as to the type of modulation scheme the MS should use when transmitting to the BS 10.

To explain the concepts and principles of this channel variation detection techniques, the UL channel of the an arbitrary MS, e.g., MS 20(1), is considered where the transmission from the MS 20(1) to the BS 10 (and likewise from the BS 10 to the MS 20(1)) employ OFDMA communication techniques. The channel variation detection process is similar for other MSs.

In an OFDMA system, each MS is assigned a different subchannel comprised of a unique group of subcarriers. For example, the received UL traffic data is generally denoted as Y, and the data located in the subchannel of the first user is denoted $Y_1$, where the values of $Y_1$ are the values of Y at the subcarriers assigned to MS 20(1), and are zeros at other subcarriers.

A channel variation compensation parameter variable, $\Delta f$, is defined. The channel variation compensation parameter may be, for example, Doppler shift of the wireless channel between the BS 10 and a given MS. A distance metric function, $d_1(\Delta f)$, is defined for the MS 20(1) as $$d_1(\Delta f) = \operatorname*{mean}_{y_1 \in Y_1}(\min_{s \in S_1}((d(y_1(\Delta f), s))),$$

where $S_1$ is the symbol constellation set used by the MS 20(1) when transmitting to the BS 10, $Y_1(\Delta f)$ is the data $Y_1$ after being subjected to channel variation compensation, e.g., Doppler shift, $\Delta f$, and $d(y_1(\Delta f),s))$ is the distance between symbol $y_1(\Delta f)$ in the received data to its closest symbol s in the symbol constellation set $S_1$.

At 105, the received signal is demodulated to recover the data in the received signal, called received data herein, e.g., $Y_1$ for MS 20(1). Next, at 110, the distance metric of the received data $Y_1$ to the transmitting constellation set is computed. As explained above, the distance metric is computed from the distances for some or all symbols of the received data to their closest symbols in the symbol constellation, where the distance metric is computed as an average of the distances for some or all of the symbols of the received data. Data representing this distance metric is stored as a first distance metric, referred to herein as $d_1(0)$, which corresponds to a value of the distance metric function $d_1(\Delta f)$ when $\Delta f=0$, that is with no imposed channel variation compensation (e.g., no imposed Doppler shift). Said another way, the distance metric $d_1(0)$ is the distance metric for the (unaltered or unshifted) received data.

FIG. 4 shows a diagram to illustrate the computation made at 110. FIG. 4 illustrates an example of a symbol constellation 200 comprising points 210(1)-210(4) that correspond to symbols. A point 220 corresponds to one of the symbols in the received data or processed received data. The BS 10 knows the type of modulation scheme used by any given MS at any given time because the BS 10 transmits control messages to the MSs informing them of the modulation scheme to use. Thus, the BS 10 knows the symbol constellation set for the transmission received from each MS, and in fact needs to know this in order to demodulate a received signal. The BS 10 computes the distance between the point 220 corresponding to one of the symbols in the received data (and processed received data) to the closest symbol in the symbol constellation 200, and makes this computation for some or all of the symbols in the received data. A single point 220 is for only one symbol of received data is shown for simplicity and it is understood that the received data (and likewise processed received data) comprises multiple symbols. The distances corresponding for the symbols in the received data (and processed received data) to a closest symbol in the constellation set are used to calculate (e.g., by computing an average) a distance metric of the received data (and processed received data) to the transmitted symbol constellation set. It is understood that the symbol constellation 200 shown in FIG. 4 is only an example and that other more complex or simple symbol constellations may be involved depending on the type of modulation scheme employed by an MS when transmitting to the BS 10.

Referring again to FIG. 3, at 115, the first distance metric $d_1(0)$ is compared with a predetermined threshold. The predetermined threshold at 115 is set to a value such that when it is exceeded, the channel is said to have substantial channel variation and thus the need for more precise channel variation detection is unnecessary. Thus, the process continues to 150 when the distance metric $d_1(0)$ is greater than the predetermined threshold. Otherwise, the process continues to 120 and 130.

When the threshold in 115 is not exceeded, then a phase of the process begins in which the received data obtained at 105 is subjected to, that is, processed by, a finite number of virtual or artificial channel variation compensations $\Delta f_1, \Delta f_2, \ldots, \Delta f_m$, e.g., Doppler shifts, to produce corresponding processed received data. From the processed received data, a distance metric derived from distances for constituent symbols to their closest symbols in the symbol constellation $S_1$ is computed as described above in connection with FIG. 4, and the corresponding distance metric is stored. The corresponding distance metrics may be denoted $d_1(\Delta f_1), d_1(\Delta f_2), \ldots, d_1(\Delta f_m)$ for the distance function $d_1(\Delta f)$ for m different channel variation compensations, e.g., Doppler shifts. It is from the distance metric for the received data at 105, and the distance metrics for the processed received data (resulting from different virtual channel variation compensations) that a measure of channel variation is determined for the wireless channel between the BS 10 and a given MS, e.g., MS 20(1).

For example, at 120, the received data is processed or subjected to a first virtual channel variation compensation, resulting in first processed received data. In one example, the first virtual channel variation compensation is a first Doppler shift, e.g., a Doppler shift of +200 Hz. Similarly, at 130, the received data is processed or subjected to a second virtual channel variation compensation, e.g., a second Doppler shift of −200 Hz, resulting in second processed received data. The virtual channel variation compensation functions 120 and 130 on the received data may be implemented in the frequency domain with a finite length signal processing (filter) functions, for example.

At 125, the distance metric derived from distances for symbols of the first processed received data to their closest symbols in the symbol constellation $S_1$ is computed in much the same manner as the computation described above in connection with function 110 and FIG. 4. The result of the computation at 125 is a second distance metric for the first processed received data. The second distance metric is denoted $d_1(\Delta f_1)$. Likewise, at 135, the distance metric derived from distances for symbols of the second processed received data to their closest symbols in the symbol constellation $S_1$ is computed in much the same manner as the computation described above in connection with function 110 and FIG. 4. The result of the computation at 135 is a third distance metric for the second processed received data. The third distance metric is denoted $d_1(\Delta f_2)$. Thus, in the example shown in FIG. 3, the number of channel variation compensations m, e.g., Doppler shifts, is equal to 2. It should be understood that an additional number of channel variation compensations may be used (m>2) to provide greater accuracy to the ultimate measure of channel variation.

Next at 140, an estimate of the channel variation of the channel is derived from the distance metric for the received data (with no imposed channel variation) and the distance metrics resulting from the processed received data for each of the virtual channel variation compensations. In the example where m=2 as shown in FIG. 3, the input to the function 140 is the first distance metric $d_1(0)$, the second distance metric $d_1(\Delta f_1)$ and the third distance metric $d_1(\Delta f_2)$. More specifically, the function 140 operates to compute a value that is a measure of channel variation according to a minimum point of a curve that is derived from the distance metrics. The curve may be represented by a predetermined finite order function, such as a second order function, and is derived or built from the distance metrics produced at 110, 125 and 135.

Reference is made to FIG. 5 for a more detailed description of the function 140. FIG. 5 shows a curve 300 represented by a second order function for the distance metric function $d_1(\Delta f)$ where an MS has negligible or essentially zero movement. The minimum of this curve is aligned with a Doppler shift of 0 Hz. When the MS is moving, the minimum of the curve for the distance metric function is not centered at 0 Hz. Thus, according to the function 140, points corresponding to the distance metrics $d_1(0)$, $d_1(\Delta f_1)$ and $d_1(\Delta f_2)$ (and in general, $d_1(0), d_1(\Delta f_1), \ldots, d_1(\Delta f_m)$) are used to build a curve 400 (similar to curve 300) based on a predetermined finite order function, e.g., a second order function. The distance metrics $d_1(0)$, $d_1(\Delta f_1)$ and $d_1(\Delta f_2)$ may be actual points on the curve, or the curve may be derived by interpolation with respect to these points. Once data describing the curve 400 is computed, the minimum point of the curve 400 is computed. FIG. 5 shows the minimum of curve 400 at reference numeral 410. The distance between the minimum point 410 of the curve 400 and a reference, e.g., zero Doppler shift (0 Hz), is the estimated channel variation parameter or value. In the example shown in FIG. 5, the estimated channel variation value would be, in terms of a Doppler shift, approximately +175 Hz.

Turning back to FIG. 3, based on the estimated channel variation value (e.g., estimated Doppler shift channel variation value) is computed at 140, the channel variation of the wireless channel between the BS 10 and a given MS, e.g., MS 20(1), is classified as one of a plurality of channel variation types. For example, the channel variation may be classified as either stationary, varied or highly varied, depending on the estimated channel variation value. The magnitude of the estimated channel variation value determines the channel variation type to which the wireless channel is classified.

When it is determined at 115 that the first distance metric exceeds the threshold, then the first distance metric alone may be used to classify the channel variation type. The threshold may be set at a relatively large value (e.g., 400 Hz in terms of a Doppler shift). Thus, when the threshold is exceeded at 115, the channel variation will be classified at 150 as highly varied. There is no need to compute the distance metrics at 125 and 135 for multiple channel variation compensations in this case. Thus, when the first distance metric $d_1(0)$ for the received data is larger than the threshold, the channel variation is determined based solely on the distance metric $d_1(0)$ for the received data.

On the other hand, when the first distance metric does not exceed the threshold at 115, the channel variation is estimated using the functions 120, 125, 130, 135 and 140 described above. Then, at 150, the classification of the channel variation will likely be either stationary or varied, but not likely highly varied.

At 160, the classified channel variation type determined at 150 is used as input to select an optimal transmission scheme comprising a parameter for at least one of a data rate, modulation type and coding rate. For example, when the channel classification type is highly varied, then the data rate may be lowered, the coding depth increased and modulation type selected (resulting in lower data throughput) to account for potentially greater possibility of errors in the transmission from the BS 10 to MS for which the channel variation is determined. On the other hand, when the channel variation classification indicates that the wireless channel is stationary or just varied (not highly varied), then the data rate may be increased, coding depth decreased and modulation type selected to increase data throughput.

The BS 10 performs the process logic 100 for each MS with which it communicates. Each MS may have different channel variation conditions because each MS may be moving or not moving in a manner that is totally independent of other MSs. The BS 10 keeps track of the channel variation for individual MSs and adjusts the transmission parameters to each MS separately.

The techniques described herein are useful in systems where one device on the link may be moving, but it still desirable to maximize data throughput. During times when the channel variation between the BS 10 and any given MS is low, the BS 10 can adjust the DL transmission parameters (data rate, coding depth, modulation type, etc.) to increase the data throughput, and then during times when the channel variation is relatively high, the BS 10 can adjust the transmission parameters to lower the data throughput to account for the potential for greater errors at the MS.

Furthermore, these techniques operate on normal traffic received by the BS from MSs. No specially configured signals are needed. The BS computes a distance metric function that is unique to each MS, and the channel variation of each wireless channel is estimated by calculating the minimum point of its distance metric function (curve) as described above in connection with function 140 in FIG. 3. A finite number of distance metrics are needed to build the distance metric function (curve), and from which the minimum of the resulting curve is estimated that represents the channel variation of the wireless channel between the MS and the BS. Moreover, these techniques do not require pilot signals, traffic history storage, specially configured feedback signals, etc.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving at a first wireless communication device a wireless transmission sent by a second wireless communication device;
   recovering received data from the wireless transmission received at the first wireless communication device;
   processing the received data with each of multiple channel variation compensations to produce corresponding processed received data subjected to respective ones of the multiple channel variation compensations;
   for symbols in the received data and in each of the processed received data, computing distances to their closest symbols in a symbol constellation set used by the second wireless communication device in the wireless transmission and computing a corresponding distance metric from the distances for symbols in the received data and from the distances for symbols in each of the processed received data; and
   determining a channel variation of a wireless channel between the first wireless communication device and the second wireless communication device based on the distance metrics.

2. The method of claim 1, and further comprising adapting at least one of a transmission modulation and transmission data rate used by the first wireless communication device when transmitting to the second wireless communication device based on the channel variation.

3. The method of claim 1, wherein determining comprises generating data describing a curve derived from the distance metric from the distances for symbols in the received data and distance metrics from the distances for symbols in each of the processed received data, computing a minimum of the curve, computing a distance between the minimum to a reference and generating an estimated channel variation value based on the distance between the minimum of the curve to the reference.

4. The method of claim 3, wherein determining further comprises classifying channel variation of the wireless channel as one of a plurality of channel variation types based on the estimated channel variation value.

5. The method of claim 4, wherein classifying comprises classifying the wireless channel as one of stationary, varied and highly varied, based on the estimated channel variation value.

6. The method of claim 1, wherein processing comprises processing the received data with each of multiple Doppler shifts, and wherein computing comprises computing a distance metric for the received data with no imposed Doppler shift and computing a distance metric for each of the processed received data resulting from processing by respective ones of the Doppler shifts.

7. The method of claim 6, wherein processing comprises processing the received data with a first positive Doppler shift and with a second negative Doppler shift, and wherein computing comprises computing a first distance metric for the received data with no imposed Doppler shift, computing a second distance metric for processed received data resulting from the first positive Doppler shift and a third distance metric for processed received data resulting from the second negative Doppler shift.

8. The method of claim 7, wherein determining comprises generating data describing a curve derived from the first, second and third distance metrics according to a predetermined finite order function, computing a minimum of the curve, computing a distance between the minimum to a zero Doppler shift reference, and generating an estimated Doppler shift channel variation value based on the distance between the minimum of the curve to the zero Doppler shift reference.

9. The method of claim 8, wherein determining further comprises classifying channel variation of the wireless channel as one of a plurality of channel variation types based on the estimated Doppler shift channel variation value.

10. The method of claim 1, and further comprising comparing the distance metric for the received data with a threshold, and wherein processing the received data to produce the processed received data for multiple channel variation compensations and computing distance metrics for each of the processed received data are performed only when the distance metric for the received data is less than the threshold.

11. The method of claim 10, wherein when the distance metric for the received data is greater than the threshold, said determining is based solely on the distance metric for the received data.

12. An apparatus comprising:
    at least one antenna;
    a receiver that is configured to connect to the at least one antenna and to produce a received signal associated with wireless transmissions received from another wireless communication apparatus;
    a controller configured to connect to the receiver, wherein the controller is configured to:
      recover received data from the received signal;
      process the received data with each of multiple channel variation compensations to produce corresponding processed received data subjected to respective ones of the multiple channel variation compensations;
      for symbols in the received data and in each of the processed received data, compute distances to their closest symbols in a symbol constellation set used by the second wireless communication in the wireless transmissions and compute a corresponding distance metric from the distances for symbols in the received data and from the distances for symbols in each of the processed received data; and
      determine a channel variation of a wireless channel with respect to the other wireless communication apparatus based on the distance metrics.

13. The apparatus of claim 12, wherein the controller is configured to adapt at least one of a transmission modulation scheme and data rate when transmitting to the other wireless communication apparatus based on the channel variation determined for the wireless channel.

14. The apparatus of claim 12, wherein the controller is configured to determine the channel variation by generating data describing a curve derived from the distance metric from the distances for symbols in the received data and distance metrics from the distances for symbols in each of the processed received data, computing a minimum of the curve, computing a distance between the minimum to a reference and generating an estimated channel variation value based on the distance between the minimum of the curve to the reference.

15. The apparatus of claim 14, wherein the controller is configured determine channel variation by classifying channel variation of the wireless channel as one of a plurality of channel variation types based on the estimated channel variation value.

16. The apparatus of claim 12, wherein the controller is configured to process the received data with each of multiple Doppler shifts, and is configured to compute a distance metric for the received data with no imposed Doppler shift and to compute a distance metric for each of the processed received data resulting from respective ones of the Doppler shifts.

17. The apparatus of claim 12, wherein the controller is further configured to compare the distance metric for the received data with a threshold, and wherein the controller is configured to process the received data to produce the processed received data for multiple channel variation compensations and to compute distance metrics for each of the processed received data only when the distance metric for the received data is less than the threshold.

18. The apparatus of claim 17, wherein when the distance metric for the received data is greater than the threshold, the controller is configured to determine the channel variation based solely on the distance metric for the received data.

19. A tangible computer-readable medium comprising logic for execution encoded therein that when executed is operable to:
  recover received data from a wireless transmission received at a first wireless communication device from a second wireless communication device;
  process the received data with each of multiple channel variation compensations to produce corresponding processed received data subjected to respective ones of the multiple channel variation compensations;
  for symbols in the received data and each of the processed received data, compute distances to their closest symbols in a symbol constellation set used by the second wireless communication device in the wireless transmission and compute a corresponding distance metric from the distances for symbols in the received data and from the distances for symbols in each of the processed received data; and
  determine a channel variation of a wireless channel between the first wireless communication device and the second wireless communication device based on the distance metrics.

20. The tangible computer-readable medium of claim 19, and further comprising logic that is configured to adapt at least one of a transmission modulation and transmission data rate used by the first wireless communication device when transmitting to the second wireless communication device based on the channel variation determined for the wireless channel.

21. The tangible computer-readable medium of claim 19, wherein the logic that processes is configured to process the received data with each of multiple Doppler shifts, and the logic that computes is configured to compute a distance metric for the received data with no imposed Doppler shift and to compute a distance metric for each of the processed received data resulting from respective ones of the Doppler shifts.

22. The tangible computer-readable medium of claim 21, wherein the logic that determines comprises logic that is configured to generate data describing a curve derived from the distance metric from the distances for symbols in the received data and distance metrics from the distances for symbols in each of the processed received data according to a predetermined finite order function, computing a minimum of the curve, compute a distance between the minimum to a zero Doppler shift reference, and generate an estimated Doppler shift channel variation value based on the distance between the minimum of the curve to the zero Doppler shift reference.

23. The tangible computer-readable medium of claim 22, wherein the logic that determines is configured to classify channel variation of the wireless channel as one of a plurality of channel variation types based on the estimated Doppler shift channel variation value.

24. The tangible computer-readable medium of claim 19, and further comprising logic that is configured to compare the distance metric for the received data with a threshold, and wherein the logic that processes is configured to process the received data to produce the processed received data for multiple channel variation compensations and the logic that computes distance metrics for each of the processed received data are performed only when the distance metric for the received data is less than the threshold.

25. The tangible computer-readable medium of claim 24, wherein the logic that determines is configured to determine the channel variation based solely on the distance metric for the received data when the distance metric for the received data is greater than the threshold.

* * * * *